US011577559B2

(12) United States Patent
Shenaq et al.

(10) Patent No.: US 11,577,559 B2
(45) Date of Patent: Feb. 14, 2023

(54) VEHICLE TOW HOOK

(71) Applicant: Ford Global Technologies, LLC, Dearborn, MI (US)

(72) Inventors: Mohammed Shenaq, Dearborn, MI (US); Sudip Sankar Bhattacharjee, Novi, MI (US); Mustafa Ahmed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 28 days.

(21) Appl. No.: 16/891,494

(22) Filed: Jun. 3, 2020

(65) Prior Publication Data

US 2021/0379943 A1 Dec. 9, 2021

(51) Int. Cl.
*B60D 1/50* (2006.01)
*B60D 1/04* (2006.01)
*B60D 1/48* (2006.01)
*B60D 1/54* (2006.01)

(52) U.S. Cl.
CPC ............... *B60D 1/50* (2013.01); *B60D 1/04* (2013.01); *B60D 1/488* (2013.01); *B60D 2001/544* (2013.01)

(58) Field of Classification Search
CPC . B60D 1/50; B60D 1/04; B60D 1/488; B60D 1/56; B60D 1/565; B60D 2001/544
See application file for complete search history.

(56) References Cited

U.S. PATENT DOCUMENTS

| 4,157,838 | A | 6/1979 | von Allworden |
| 4,575,112 | A * | 3/1986 | Tremblay ............... B60D 1/155 |
| | | | 280/479.1 |
| 5,560,630 | A | 10/1996 | Phares et al. |
| 6,712,381 | B1 | 3/2004 | Moss |
| 7,819,416 | B2 | 10/2010 | Moss |
| 8,714,592 | B1 * | 5/2014 | Thoreson ................. B60D 1/07 |
| | | | 280/769 |

(Continued)

FOREIGN PATENT DOCUMENTS

| CN | 201264493 Y | 7/2009 |
| CN | 202345319 U | 7/2012 |

(Continued)

OTHER PUBLICATIONS

Apollo Edge, "Engineering Reference: Bolted Joints (Part 1)—Shear," Apollo Engineering Design Group, Sep. 27, 2016, 6 pages.

(Continued)

*Primary Examiner* — Jacob D Knutson
*Assistant Examiner* — Abigail R Hymel
(74) *Attorney, Agent, or Firm* — Frank A. MacKenzie; Bej in Bieneman PLC

(57) ABSTRACT

An assembly includes a vehicle frame, a base fixed relative to the vehicle frame, and a hook supported by the base and rotatable relative to the base between an extended position and a retracted position. One of the hook or the base has a flange and the other of the hook or the base has a pair of extensions. The flange is between the extensions. A post is fixed relative to the flange and engages both extensions. A spring is connected to the post and one of the extensions. The spring is positioned to bias the hook toward the extended position.

20 Claims, 8 Drawing Sheets

(56) References Cited

U.S. PATENT DOCUMENTS

| | | | |
|---|---|---|---|
| 2009/0108566 A1* | 4/2009 | Asjad | B60D 1/54 |
| | | | 280/498 |
| 2011/0209310 A1 | 9/2011 | Szczepanek | |
| 2017/0334257 A1* | 11/2017 | Stickles | B60R 3/02 |
| 2018/0208006 A1* | 7/2018 | Farooq | B60D 1/488 |
| 2018/0257445 A1* | 9/2018 | Degenkolb | B60D 1/54 |
| 2019/0084361 A1* | 3/2019 | Ghannam | B60D 1/243 |
| 2019/0351721 A1* | 11/2019 | Klein | B60D 1/54 |

FOREIGN PATENT DOCUMENTS

| | | |
|---|---|---|
| CN | 205930075 U | 2/2017 |
| EP | 1586470 A1 | 10/2005 |
| EP | 2248688 B1 | 3/2010 |
| JP | 2007237867 A | 9/2007 |
| KR | 20120041363 A | 10/2010 |
| KR | 101080724 B1 | 11/2011 |
| WO | 2006068479 A1 | 6/2006 |

OTHER PUBLICATIONS

Non-Final Office Action for related U.S. Appl. No. 16/208,891 as issued by the USPTO dated Nov. 20, 2020.

* cited by examiner

VEHICLE TOW HOOK

BACKGROUND

Vehicles typically include tow hooks used for towing the vehicle, for example, if the vehicle becomes stuck in mud, snow, a ditch, etc. The tow hooks serve as attachment points for straps or chains to be attached to the vehicle, and the straps/chains are then used to pull the vehicle to a more suitable driving surface. The tow hooks may be fixed to a frame of the vehicle so that the pulling force on the tow hook is transmitted to the frame of the vehicle. The tow hooks may be located at a front end of a vehicle and/or at a rear end of the vehicle.

DETAILED DESCRIPTION

An assembly includes a vehicle frame, a base fixed relative to the vehicle frame, and a hook supported by the base and rotatable relative to the base between an extended position and a retracted position. One of the hook or the base have a flange and the other of the hook or the base have a pair of extensions. The flange is between the extensions. A post is fixed relative to the flange and engages both extensions. A spring is connected to the post and one of the extensions. The spring positioned to bias the hook toward the extended position.

The assembly may include a second spring connected to the post and the other of the extensions. The second spring may be positioned to bias the hook toward the extended position. The extensions and the flange may be between the spring and the second spring. The post may extend through the extensions and the flange. The spring and the second spring may be coiled about the post.

The post may extend through the extensions and the flange.

The spring may be coiled about the post.

The extensions may be rotatable about the post between the extended position and the retracted position.

The base may extend from the vehicle frame to the post.

The base may curve from the vehicle frame to the hook in a first cross-vehicle direction and the hook curves from the base to a free end in a second cross-vehicle direction opposite the first cross-vehicle direction.

The post may be elongated along an axis that is vertical and the hook is rotatable about the axis between the extended position and the retracted position. The extensions may be spaced along the axis of the post.

The base may extend from the vehicle frame along an axis and the post may be offset from the axis.

The base may curve from the vehicle frame to the hook in a first cross-vehicle direction and the hook may curve from the base to a free end in a second cross-vehicle direction opposite the first cross-vehicle direction.

The assembly may include bumper, the hook extending through the bumper in the extended position and recessed behind the bumper in the retracted position.

The spring may be a torsion spring.

The flange may abut both extensions.

The extensions may abut the flange in parallel planes. The extensions may each include a planar surface and the flange may include planar surfaces abutting the planar surfaces of the extensions.

Figure 8:
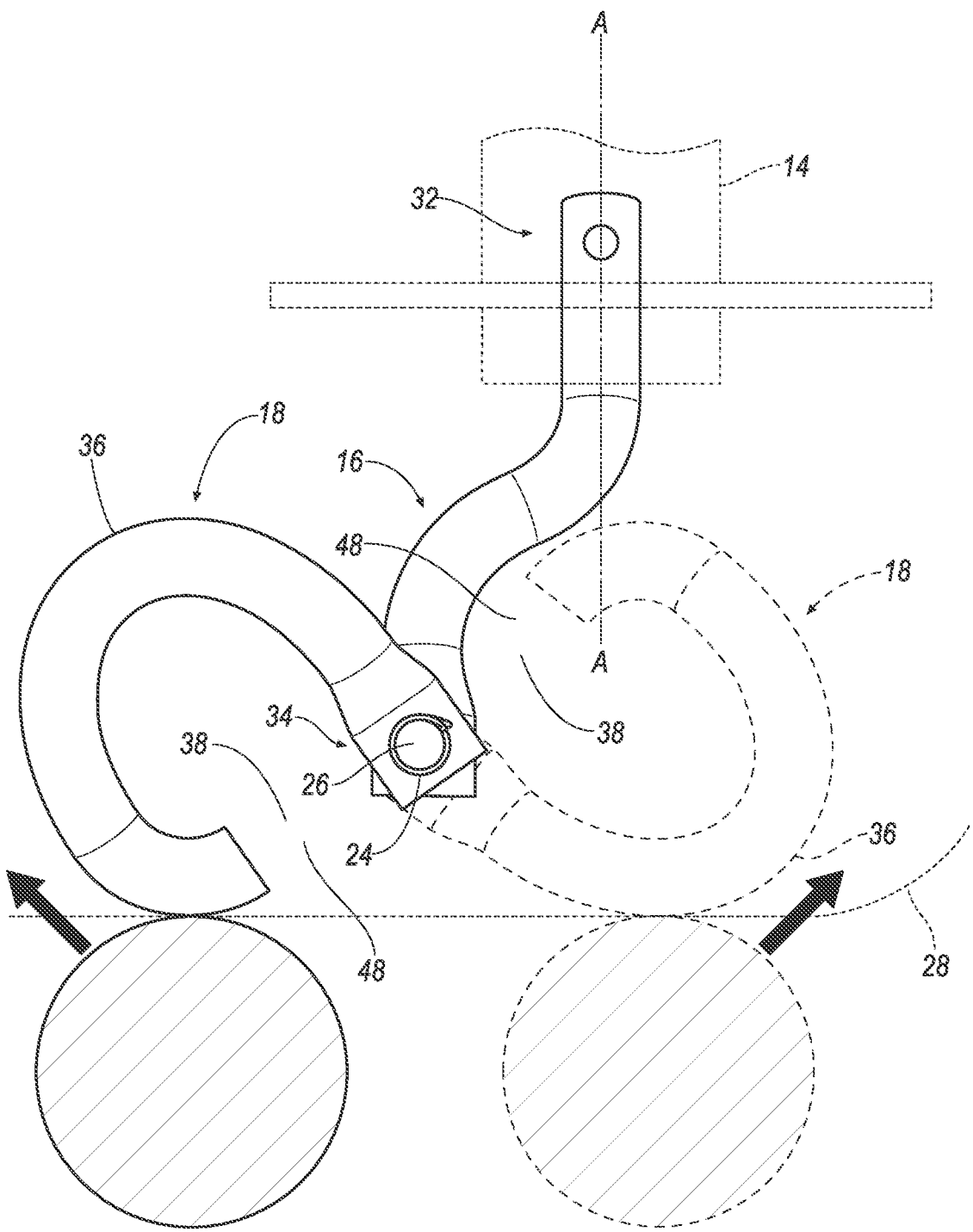
FIG. 8 is a top view of the embodiment of FIG. 7 with the tow hook in the retracted position.

With reference to the Figures, wherein like numerals indicate like parts throughout the several views, an assembly 10 for a vehicle 12 includes a vehicle frame 14. The assembly 10 includes a base 16 fixed relative to the vehicle frame 14. A hook 18 is supported by the base 16. The hook 18 is rotatable relative to the base 16 between an extended position (FIG. 3) and a retracted position (FIGS. 4 and 8). One of the hook 18 or the base 16 includes a flange 20 and the other of the hook 18 or the base 16 includes a pair of extensions 22. The flange 20 is between the extensions 22. A post 26 is fixed relative to the flange 20 and engages both extensions 22. The assembly 10 includes a spring 24 connected to the post 26 and one of the extensions 22. The spring 24 is positioned to bias the hook 18 toward the extended position.

In the extended position, the hook 18 may be used, for example, to pull the vehicle 12. As an example, a strap or chain of a towing vehicle may be engaged with the hook 18 such that the vehicle 12 may be pulled to dislodge the vehicle 12 from mud, snow, a ditch, etc., and move the vehicle 12 to a more suitable driving surface. Since the flange 20 is between the pair of extensions 22 and the post 26 extends through both the base 16 and the extensions 22, flange 20 and the pair of extensions 22 creates two shear planes on the post 26. This reduces the concentration of shear force on the post 26. Specifically, this divides the shear force in two, with half of the shear force at the interface between the flange 20 and one of the extensions 22 and half of the shear force at the interface between flange 20 and the other of the extensions 22. According, the extensions 22 and the flange 20 distribute shear forces along the post 26 when the hook 18 is engaged in towing.

With reference to FIGS. 4 and 8, in the event of an impact of the hook 18, e.g., impact with a pedestrian or other object, the hook 18 moves to the retracted position to reduce force delivered by the hook 18 to the impacted object, e.g., a pedestrian protection test leg form, another vehicle 12, etc., and/or to reduce the likelihood of damage to the hook 18. When the force is removed from the hook 18, the spring 24 returns the hook 18 to the extended position. In other words, the hook 18 is resettable and automatically resets to the extended position.

Figure 5:
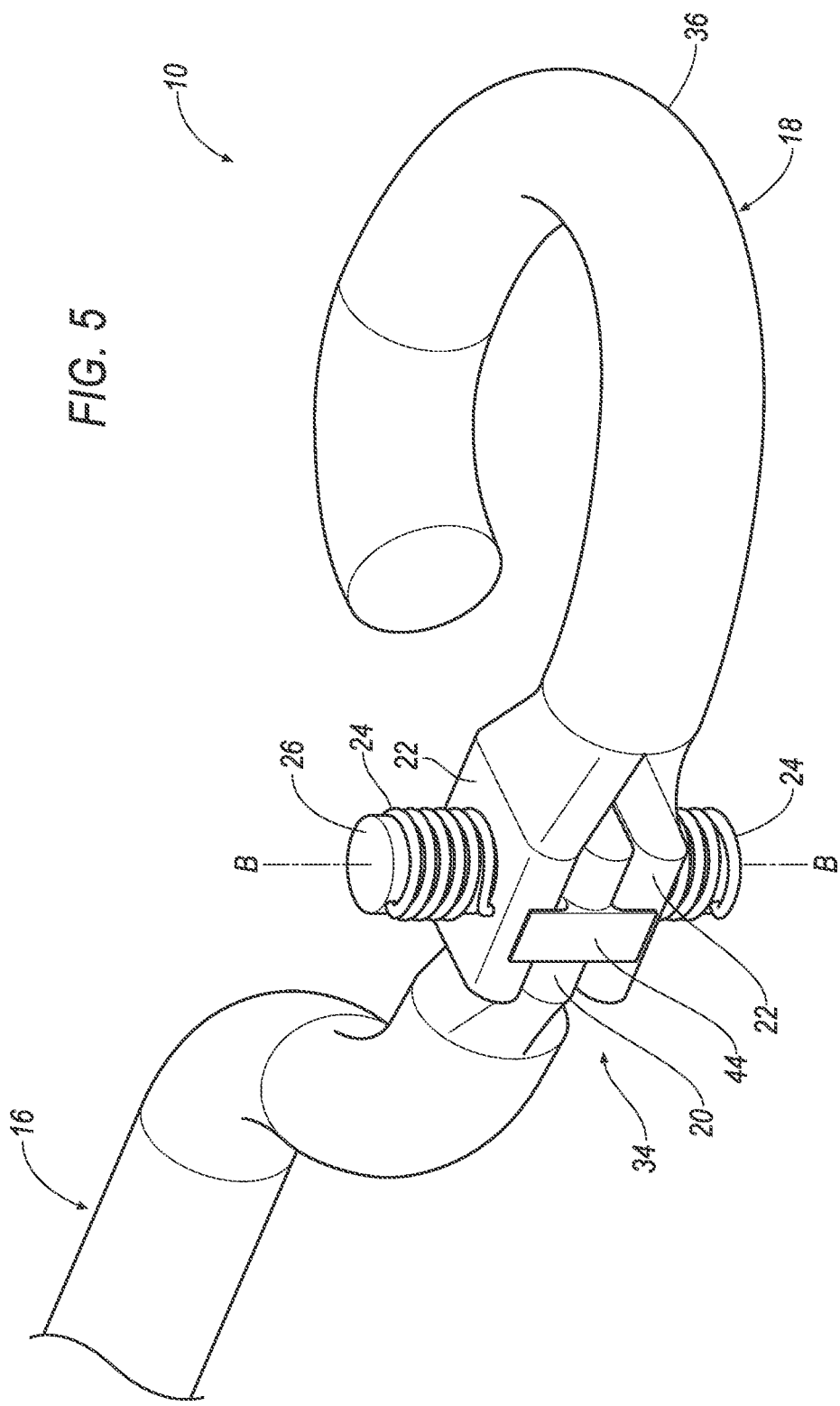
FIG. 5 is a perspective view of one embodiment of a portion of the tow hook.
Figure 6:
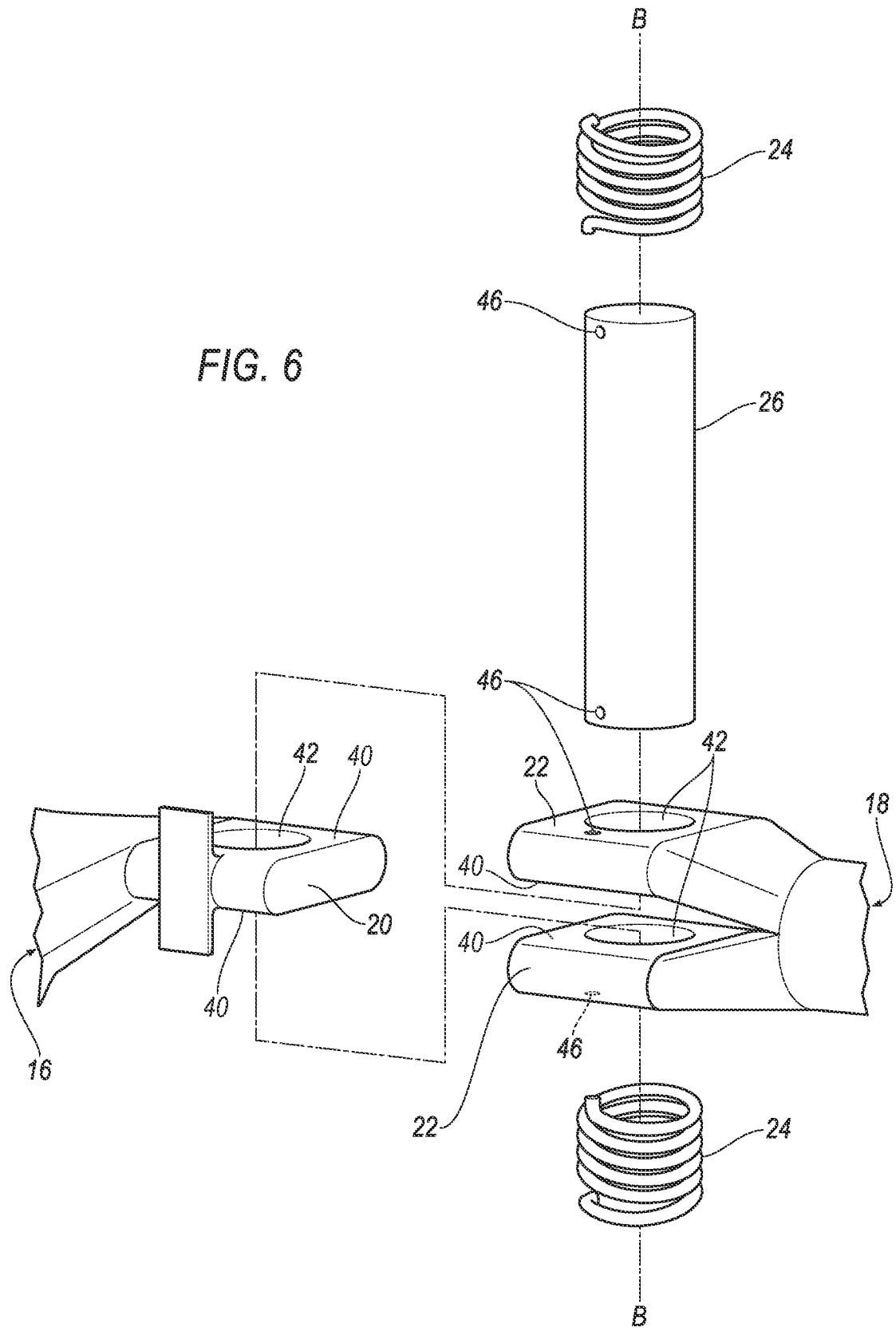
FIG. 6 is an exploded view of the embodiment of FIG. 5.
Figure 7:
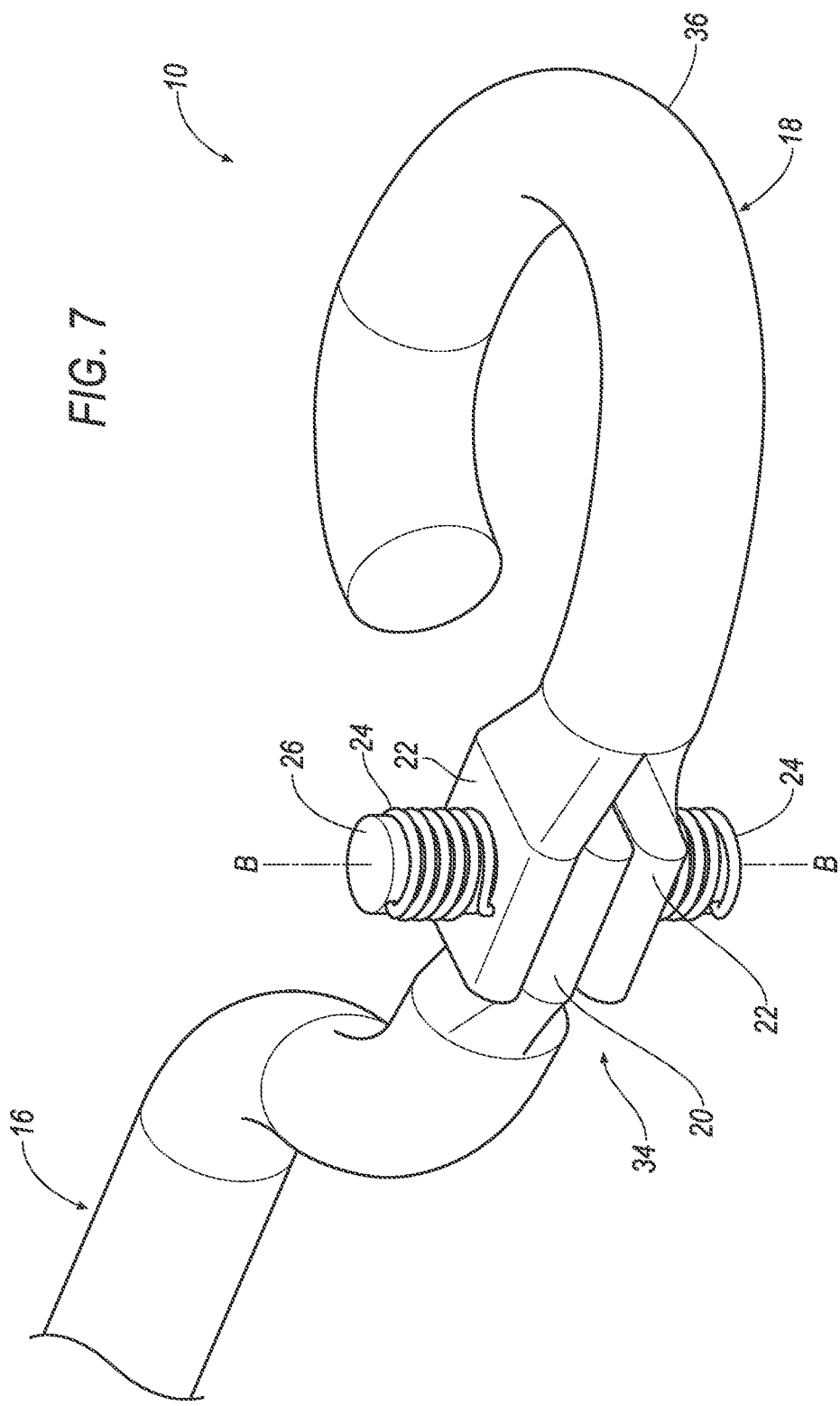
FIG. 7 is a perspective view of another embodiment of the tow hook.

One embodiment of the assembly 10 is shown in FIGS. 3-6 and another embodiment of the assembly 10 is shown in FIGS. 7-8. In the embodiment in FIGS. 3-6, the hook 18 is rotatable in one direction from the extended position to the retracted position. In the example shown in FIGS. 3-6, the assembly 10 includes a flange 20 on the base 16 that limits rotation of the hook 18 at the extended position. In the embodiment shown in FIGS. 7-8, the hook 18 is rotatable in two directions from the extended position to the retracted position. Specifically, the hook 18 is rotatable from the extended position to a first retracted position and from the extended position to a second retracted position.

Figure 1:
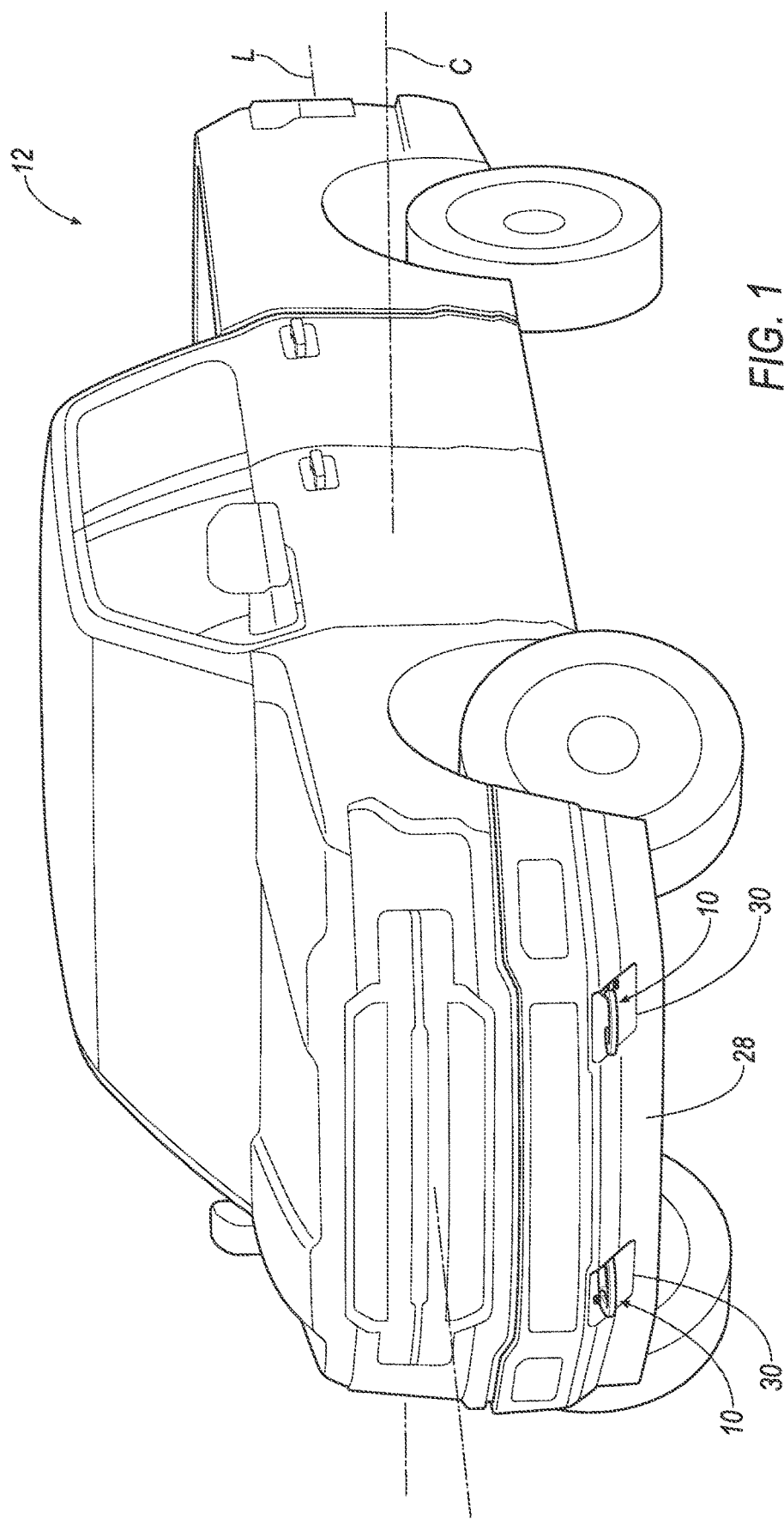
FIG. 1 is a perspective view of a vehicle including tow hooks.

With reference to FIG. 1, the vehicle 12 may be any passenger or commercial automobile such as a car, a truck, a sport utility vehicle 12, a crossover, a van, a minivan, a taxi, a bus, etc.

The vehicle frame 14 may be of any suitable type. As one example, as shown in the figures, the vehicle 12 may have a body-on-frame construction (also referred to as a cab-on-frame construction). In such an example, the vehicle 12 includes a body, and the vehicle frame 14 and the body are separate components, i.e., are modular, and the body is supported on and affixed to the frame. As another example, the vehicle 12 may have a unibody construction. In the unibody construction, the body and the vehicle frame 14 are unitary. The vehicle frame 14 and/or the body may be of any suitable material, for example, steel, aluminum, etc.

The vehicle 12 includes a bumper 28. The bumper 28 is fixed to the vehicle frame 14. The bumper 28 may extend across a front of the vehicle 12. In an alternative, the bumper 28 may extend along a rear of the vehicle 12. The bumper 28 is elongated along a cross-vehicle axis C. The bumper 28 may present a class-A surface, i.e., a surface specifically manufactured to have a high-quality, finished aesthetic appearance free of blemishes.

Figure 2:
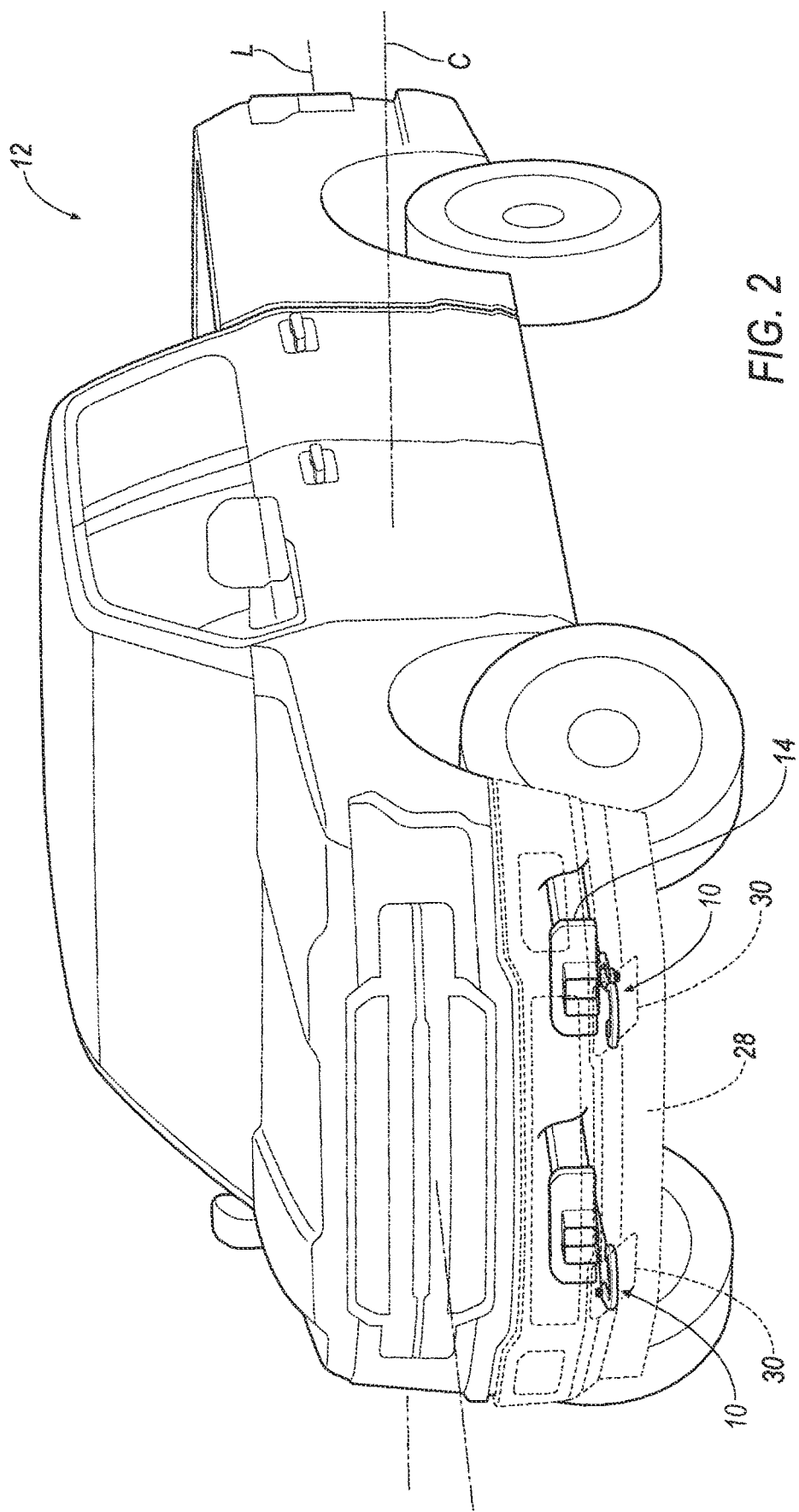
FIG. 2 is a perspective view of the vehicle with a bumper shown in broken lines to show a frame and the tow hooks fixed to the frame.
Figure 3:
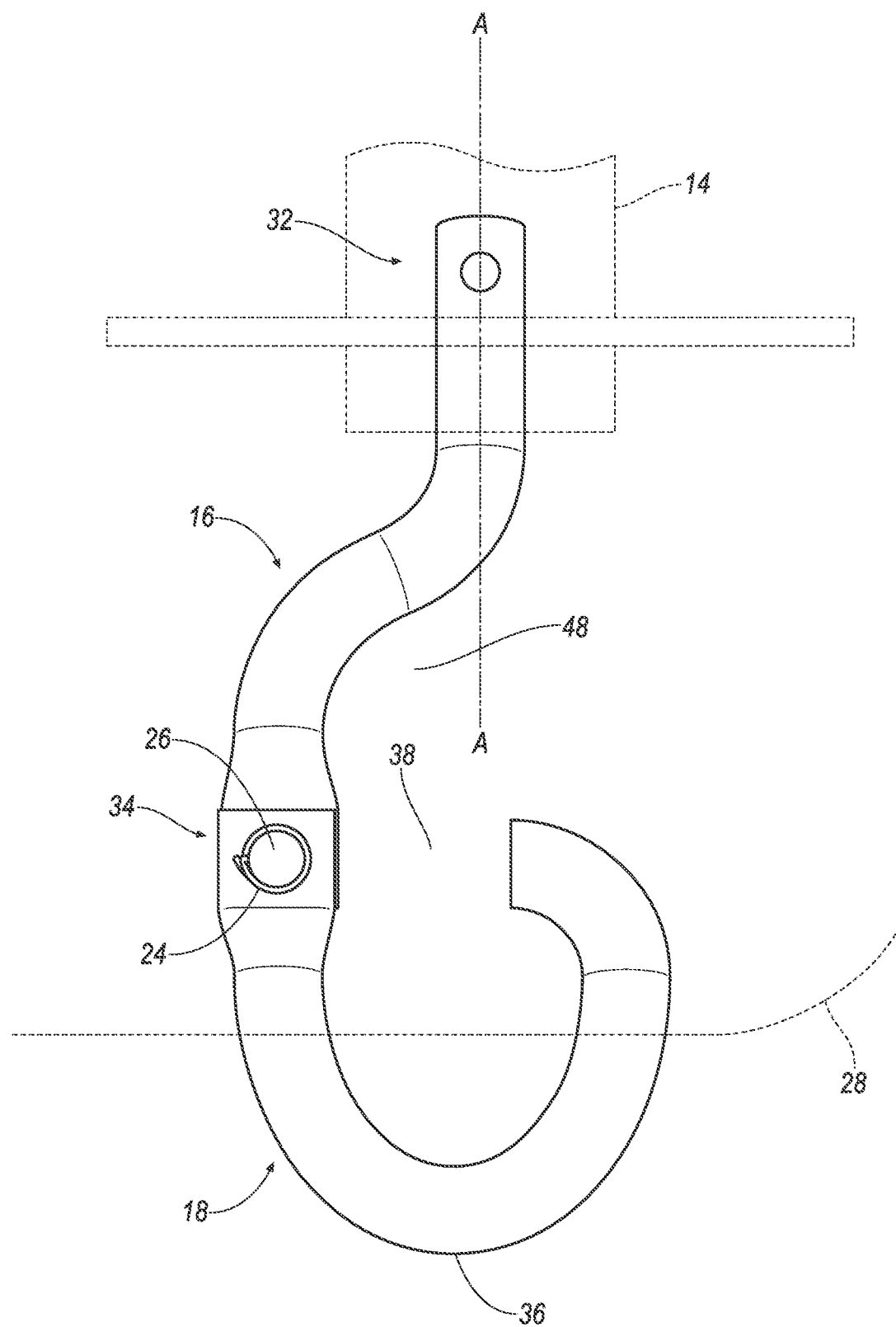
FIG. 3 is a top view of one of the tow hooks in an extended position with the frame and a bumper shown in broken lines.
Figure 4:
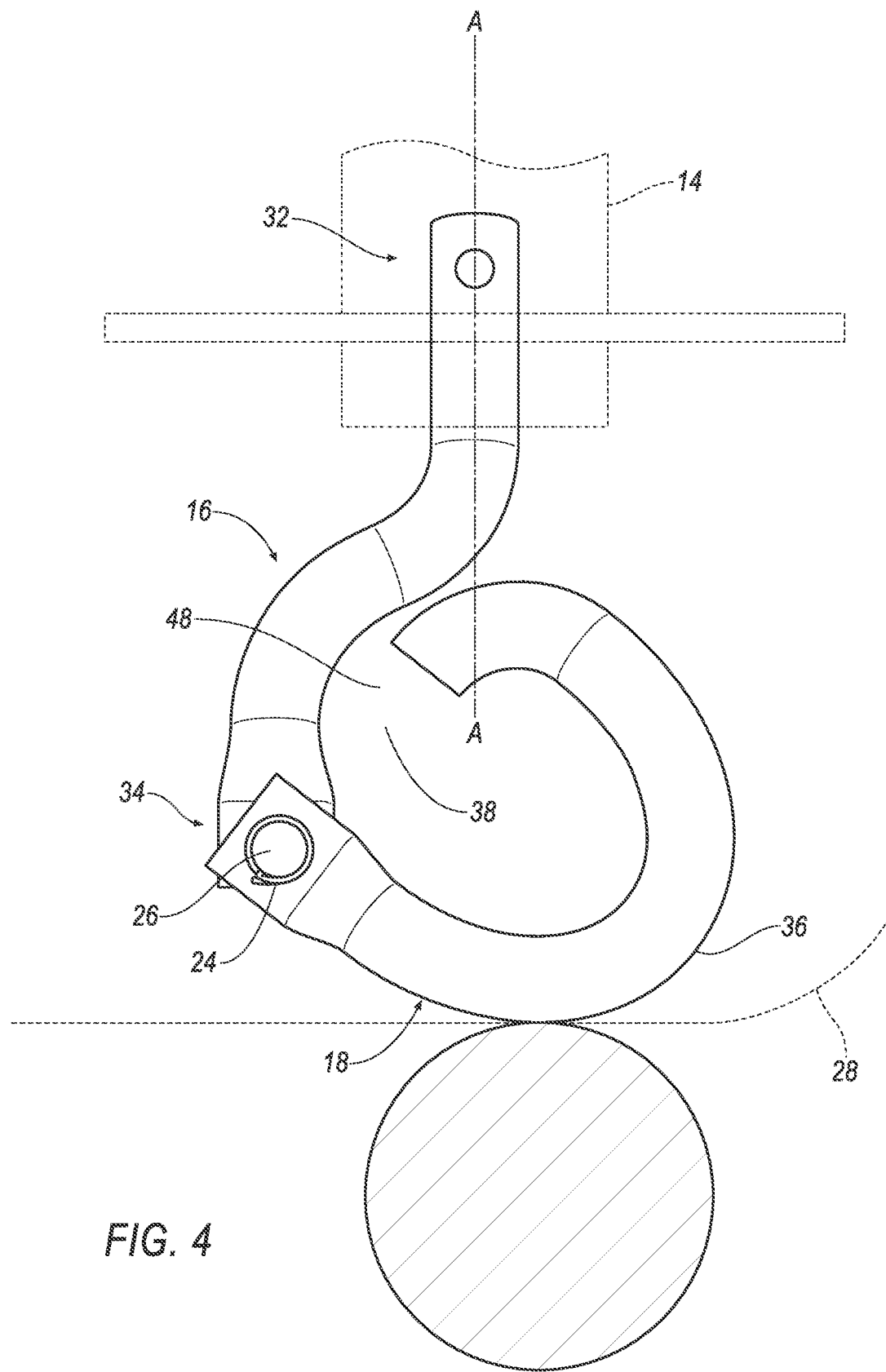
FIG. 4 is the perspective view of FIG. 3 with the tow hook in a retracted position.

With reference to FIGS. 1-3, the hook 18 may extend through the bumper 28 in the extended position. For example, the bumper 28 may include an access hole 30 for the hook 18. The access hole 30 may be sized to permit access to the hook 18.

With reference to FIGS. 4 and 8, the hook 18 may be recessed behind the bumper 28 in the retracted position. Specifically, when impacted by an object, the hook 18 may retract behind the bumper 28 so that no portion of the hook 18 extends through the access hole 30. When the hook 18 is in the retracted position, the hook 18 is recessed behind the class-A surface of the bumper 28.

The vehicle 12 may include any suitable number of tow hooks 18. In examples including more than one tow hook 18, the tow hooks 18 may be identical. As an example, two tow hooks 18 are shown in the Figures and are identical to each other with common numerals identifying the common features. The vehicle 12 may include, for example, two tow hooks 18 at the front of the vehicle 12 and/or two tow hooks 18 at the rear of the vehicle 12.

With reference to FIGS. 3 and 4, the base 16 of the assembly 10 is fixed to the vehicle frame 14. For example, the base 16 may be fixed by a fastener and/or by welding to the vehicle frame 14. The base 16 extends from the vehicle frame 14 to the post 26 along an axis A. In other words, the base 16 includes a proximal end 32 that extends away from the vehicle frame 14 along the axis A. The axis A may be parallel to a vehicle-longitudinal axis L and perpendicular to the cross-vehicle axis C. The base 16 includes a distal end 34 between the proximal end 32 and the hook 18. The base 16 may be cantilevered from the vehicle frame 14, i.e., the distal end 34 is free from the vehicle frame 14 and the weight of the base 16 is entirely supported on the vehicle frame 14 at the proximal end 32.

With reference to FIGS. 5-8, as set forth above, the hook 18 is supported by the base 16. In other words, the weight of the hook 18 rests on the base 16. The hook 18 is cantilevered from the base 16, i.e., extends from the base 16 to a free end 36 and the weight of the hook 18 is entirely supported by the base 16. Specifically, the hook 18 may be supported by the distal end 34 of the base 16.

With reference to FIGS. 4 and 8, as set forth above, the hook 18 is rotatable relative to the base 16 between the extended position and the retracted position. When impacted by an object, the hook 18 may rotate from the extended position to the retracted position, e.g., behind the bumper 28 as set forth above. The hook 18 may rotate about the distal end 34 of the base 16 to the retracted position.

With reference to FIGS. 3-8, the hook 18 may be of any suitable shape. In one example, as shown in the figures, the hook 18 may include an open loop. In other words, the hook 18 includes an opening 38 that, for example, may receive a strap or chain of a towing vehicle 12. As another example, the hook 18 may include a closed loop, i.e., may include an enclosed ring that may receive a strap or chain of a towing vehicle 12.

As set forth above, one of the hook 18 or the base 16 includes the flange 20 and the other of the hook 18 or the base 16 includes the pair of extensions 22. In one example, as shown in the Figures, the base 16 includes the flange 20 and the hook 18 includes the extensions 22. In such an example, the flange 20 may be at the distal end 34 of the base 16. In another example, the hook 18 includes the flange 20 and the base 16 includes the extensions 22. In such an example, the extensions 22 may be at the distal end 34 of the base 16.

The extensions 22 are spaced from each other and the flange 20 is between the extensions 22. In other words, the flange 20 is sandwiched between the extensions 22. The extensions 22 may, for example, each include a planar surface 40 and the flange 20 may include planar surfaces 40 facing the planar surfaces 40 of the extension 22. The planar surfaces 40 of the extensions 22 and the planar surfaces 40 of the flange 20 may be in parallel planes. The planar surfaces 40 may be elongated along the axis A.

The flange 20 may abut both extensions 22, as shown in the Figures. In the example in which the extensions 22 and the flange 20 include planar surfaces 40, the planar surfaces 40 of the flange 20 may abut the planar surfaces 40 of the extensions 22, as shown in the Figures. In the example shown in the Figures, the planar surfaces 40 of the flange 20 and the planar surfaces 40 of the extensions 22 are in parallel planes and thus the flange 20 abuts the extension 22 s in parallel planes.

With continued reference to FIGS. 3-8, the assembly 10 includes the post 26 between the hook 18 and the base 16. The post 26 connects the extensions 22 and the flange 20. Specifically, the post 26 connects the hook 18 and the base 16 at the distal end 34 of the base 16, i.e., the post 26 is between the proximal end 32 and the hook 18.

The post 26 extends through the extensions 22 and the flange 20. The post 26 extends from the extensions 22 in a direction away from the flange 20. With reference to FIG. 6, the extensions 22 and the flange 20 may include holes 42 that receive the post 26 to connect to the hook 18 to the base 16. When towing force is applied to the hook 18, the hook 18 and base 16 pull the post 26 in opposite directions and apply shear forces on the post 26. As set forth above, the extensions 22 being on opposite sides of the flange 20 distributes the shear force on the post 26 when pulling force is applied to the hook 18, e.g., during towing. Specifically, the extensions 22 divide the shear force to two shear planes to reduce stress concentrations.

The post 26 is elongated along an axis B. The axis B may be vertical, as shown in the Figures. The extensions 22 are spaced from one another along the axis B of the post 26, i.e., the extensions 22 may be spaced along the post 26. The hook 18 is rotatable about the axis B between the extended position and the retracted position, i.e., the hook 18 is rotatable about the post 26. Specifically, the extensions 22 are rotatable about the post 26 between the extended position and the retracted position. When a load is applied to the hook 18, the hook 18 rotates about the post 26 to the retracted position.

The post 26 is fixed relative to the flange 20. Specifically, the post 26 is rotationally fixed relative to the flange 20 (i.e., the post 26 and the flange 20 rotate together as a unit about the axis B) and the post 26 may be axially fixed relative to the flange 20 (i.e., with the post 26 and the flange 20 moving together as a unit axially along axis B). In the example shown in the Figures, the post 26 is rotationally fixed and axially fixed relative to the flange 20. In an example in which the hook 18 includes the flange 20, the post 26 is fixed relative to the hook 18. In another example in which the base 16 includes the flange 20, the post 26 is fixed relative to the base 16.

The post 26 may be connected to the flange 20 in any suitable manner to fix the post 26 relative to the flange 20. As an example, the hole 42 in the flange 20 and an exterior surface of the post 26 may be splined such that the post 26 and the flange 20 are rotationally fixed to each other and rotate together as a unit about the axis B. In such an example, the post 26 may be axially fixed relative to the flange 20 along the axis B with a locking pin that extends through the flange 20 and into the post 26. As other examples, the post 26 may be fixed relative to the flange 20 in any suitable fashion, including any one or combination of welding, splines, locking pin, etc.

With reference to FIGS. 5-7, as set forth above, the spring 24 is connected to the post 26 and one of the extensions 22. The assembly 10 may include two springs 24, as shown in the Figures. In such an example, one of the springs 24 is connected to the post 26 and one of the extensions 22 and the other of the springs 24 is connected to the post 26 and the other of the extensions 22. Specifically, the extensions 22 and the flange 20 are between the springs 24. In examples including two springs 24, the two springs 24 may be identical or may be different.

As shown in the Figures, the spring 24 may be positioned on an opposite side of the first extension 22 from the flange 20. In such an example, the extension 22 is between the spring 24 and the flange 20, as shown in the Figures.

The spring 24 is positioned to bias the hook 18 from the retracted position to the extended position. The spring 24 operatively engages the base 16 and the hook 18 to bias the hook 18 from the retracted position to the extended position when the spring 24 is loaded. Rotation of the hook 18 toward the retracted position loads the spring 24 and the spring 24 returns the hook 18 to the extended position when a load is removed from the hook 18.

In one example, the hook 18 may be unbiased by the spring 24 when the hook 18 is in the extended position, i.e., the spring 24 does not bias the hook 18 when the hook 18 is in the extended position. In such an example, the spring 24 is sized, shaped, and/or positioned such that the spring 24 is not loaded by the hook 18 until the hook 18 is rotated from the extended position toward the retracted position. In the embodiment of FIGS. 3-6 and the embodiment of FIGS. 7 and 8, the spring 24 may be unbiased in the extended position.

In another example, the spring 24 may continuously bias the hook 18 toward the extended position, i.e., even when the hook 18 is in the extended position. In such an example, the assembly 10 may include a component to stop the hook 18 in the extended position to counteract the spring 24 force while still allowing the hook 18 to rotate from the extended position to the retracted position. As an example, the spring 24 may continuously bias the hook 18 toward the extended position in the embodiment of FIGS. 3-6. Specifically, the assembly 10 may include the finger 44 extending from the base 16 adjacent the hook 18 when the hook 18 is in the extended position. In the extended position, the spring 24 biases the hook 18 against the finger 44 and the flange 20 prevents over-extension of the hook 18 beyond the extended position. As other examples, the assembly 10 may include any suitable component on the hook 18, the base 16, the vehicle frame 14, and/or the bumper 28 to stop the hook 18 in the extended position.

In the example shown in the Figures, one end of the spring 24 engages the extension 22 and the other end of the spring 24 engages the post 26 to bias the hook 18 toward the extended position. Specifically, one end of the spring 24 is fixed to the first extension 22 and the other end of the spring 24 is fixed to the post 26 such that spring 24 force builds in the spring 24 when the hook 18 rotates to the retracted position because the end of the spring 24 rotates with the hook 18. The spring 24 operatively engages the base 16 and the hook 18 to bias the hook 18 from the retracted position to the extended position. Rotation of the hook 18 toward the retracted position loads the spring 24 and the spring 24 returns the hook 18 to the extended position when a load is removed from the hook 18.

With reference to FIGS. 5-7, the spring 24 may include ends that are fixed to the post 26 and the hook 18 in recesses 46 in the post 26 and the hook 18. The ends of the spring 24 may be bent to engage the recesses 46. As other examples, the spring 24 may be fixed to the post 26 and the hook 18 by, for example, fastening, welding, etc.

As shown in the Figures, the spring 24 may be coiled about the post 26. The spring 24 may be a torsion spring. As another example, the spring 24 may be any type of spring 24 that would be suitable to bias the hook 18 toward the extended position. One or more sheaths (not shown) may surround the post 26 and spring 24 to conceal the spring 24.

The post 26 and distal end 34 of the base 16 may be offset from the axis A. Specifically, the post 26 and distal end 34 of the base 16 may be offset from the axis A in a cross-vehicle direction. For example, the base 16 curves from the vehicle frame 14 to the hook 18 in a cross-vehicle direction and in a vehicle-forward direction (in the example where the tow hook 18 is at the rear of the vehicle 12, the base 16 curves in a cross-vehicle direction and a vehicle-rearward direction). The base 16 curves to the left in the view shown in the Figures, and the base 16 may alternatively curve to the right.

Since the post 26 is offset from the axis A in a cross-vehicle direction, impact with an object causes the hook 18 to rotate. In other words, the offset creates a moment when the hook 18 is impacted by the object, which causes the hook 18 to rotate about the post 26. The base 16 and the hook 18 may curve in opposite directions to encourage the rotation of the hook 18 to the retracted position when impacted. For example, with reference to FIGS. 3-4, the base 16 may curve from the frame to the post 26 in a first cross-vehicle direction and the hook 18 may curve from the post 26 to the free end in a second cross-vehicle direction opposite the first cross-vehicle direction. In the view shown in the Figures, the first cross-vehicle direction is to the left and the second cross-vehicle direction is to the right; alternatively, the first cross-vehicle direction may be to the right and the second cross-vehicle direction may be to the left. The curve of the hook 18 in a direction opposite the curve of the base 16 encourages rotation of the hook 18 toward the retracted position when impacted by an object. The curve of the hook 18 in a direction opposite the curve of the base 16 encourages rotation of the hook 18 toward the retracted position when impacted by an object regardless of the cross-vehicle position of the object. In other words, in a scenario where the object is offset from the axis A, when the object impacts the hook 18, the geometry of the opposite curves of the base 16 and the hook 18 encourages rotate of the hook 18 toward the retracted position.

In another example, the base 16 may be straight from the vehicle frame 14 along the axis A. In this example, the hook 18 may rotate about the axis A when an object impacts the hook 18 in the same way as described above.

The hook 18 may be arcuate. Specifically, the free end 36 of the hook 18 may be arcuate. This shape encourages rotation of the hook 18 toward the retracted position when impacted by an object regardless of the cross-vehicle position of the object.

As shown in the Figures, the base 16 defines a recess 48 and the hook 18 is rotatable into the recess 48. Specifically, the curve of the base 16 from the frame to the post 26 defines the recess 48 between the base 16 and the hook 18. The recess 48 defined by the hook 18 is open to the hook 18 so that the hook 18 is rotatable into the recess 48. The recess 48 may be sized to receive the hook 18 in the retracted position.

In operation, the hook 18 may be in the extended position in the absence of an external force on the hook 18. For example, the hook 18 may extend through the access hole 30 of the bumper 28 in the extended position. When impacted by an object with suitable force, the hook 18 rotates from the extended position toward the retracted position. In the retracted position, the hook 18 may be disposed in the recess 46 defined by the base 16. As the hook 18 rotates toward the retracted position, the hook 18 loads the spring 24, which absorbs energy from the object. Once the object is moved such that force on the hook 18 is removed, the spring 24 rotates the hook 18 back to the extended position.

As set forth above, with reference to FIGS. 7-8, the hook 18 may rotate relative to the base 16 from the extended position to two retracted positions, i.e., the first retracted position and the second retracted position. The second retracted position is opposite the first retracted position. The spring 24 biases the hook 18 toward the extended position when the hook 18 is moved to the first retracted position or the second retracted position. In examples including more than two springs 24, the springs 24 may operate in tandem to bias the hook 18 toward the extended position when the hook 18 both when the hook 18 is in the first retracted position and the second retracted position.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
a vehicle frame defining a vehicle-longitudinal axis and a cross-vehicle axis perpendicular to the vehicle-longitudinal axis;
a base fixed relative to the vehicle frame;
a hook supported by the base and rotatable relative to the base between an extended position and a retracted position;
one of the hook or the base having a flange and the other of the hook or the base having a pair of extensions, the flange being between the extensions;
a post fixed relative to the flange and engaging both extensions;
a spring connected to the post and one of the extensions, the spring positioned to bias the hook toward the extended position;
the base extending from the vehicle frame along the vehicle-longitudinal axis and the post being offset from the vehicle-longitudinal axis; and
the base curving from the vehicle frame to the hook in a first cross-vehicle direction along the cross-vehicle axis and the hook curving from the base to a free end in a second cross-vehicle direction along the cross-vehicle axis, the second cross-vehicle direction being opposite the first cross-vehicle direction.

2. The assembly of claim 1, further comprising a second spring connected to the post and the other of the extensions, the second spring is positioned to bias the hook toward the extended position.

3. The assembly of claim 2, wherein the extensions and the flange are between the spring and the second spring.

4. The assembly of claim 3, wherein the post extends through the extensions and the flange.

5. The assembly of claim 4, wherein the spring and the second spring are coiled about the post.

6. The assembly of claim 1, wherein the post extends through the extensions and the flange.

7. The assembly of claim 1, wherein the spring is coiled about the post.

8. The assembly of claim 1, wherein the extensions are rotatable about the post between the extended position and the retracted position.

9. The assembly of claim 1, wherein the base extends from the vehicle frame to the post.

10. The assembly of claim 1, wherein the post is elongated along an axis that is vertical and the hook is rotatable about the axis between the extended position and the retracted position.

11. The assembly of claim 10, wherein the extensions are spaced along the axis of the post.

12. The assembly of claim 1, further comprising a bumper, the hook extending through the bumper in the extended position and recessed behind the bumper in the retracted position.

13. The assembly of claim 1, wherein the spring is a torsion spring.

14. The assembly of claim 1, wherein the flange abuts both extensions.

15. The assembly of claim 1, wherein the extensions abut the flange in parallel planes.

16. The assembly of claim 15, wherein the extensions each include a planar surface and the flange includes planar surfaces abutting the planar surfaces of the extensions.

17. An assembly comprising:
a vehicle frame;
a base fixed relative to the vehicle frame;
a hook supported by the base and rotatable relative to the base between an extended position and a retracted position;
one of the hook or the base having a flange and the other of the hook or the base having a pair of extensions, the flange being between the extensions;

a post fixed relative to the flange and engaging both extensions;

a spring connected to the post and one of the extensions, the spring positioned to bias the hook toward the extended position; and a second spring connected to the post and the other of the extensions, the second spring is positioned to bias the hook toward the extended position.

18. The assembly of claim 17, wherein the extensions and the flange are between the spring and the second spring.

19. The assembly of claim 17, wherein the post extends through the extensions and the flange.

20. The assembly of claim 17, wherein the spring and the second spring are coiled about the post.

\* \* \* \* \*